United States Patent
Martinsson

(10) Patent No.: US 11,687,503 B2
(45) Date of Patent: *Jun. 27, 2023

(54) MAINTAINING FOREIGN KEY REFERENCES ACROSS DOMAINS

(71) Applicant: salesforce.com, inc., San Francisco, CA (US)

(72) Inventor: Lars Martinsson, Sunnyvale, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/570,798

(22) Filed: Jan. 7, 2022

(65) Prior Publication Data

US 2022/0129424 A1    Apr. 28, 2022

Related U.S. Application Data

(63) Continuation of application No. 16/518,510, filed on Jul. 22, 2019, now Pat. No. 11,249,963.

(51) Int. Cl.
*G06F 16/21* (2019.01)
*G06F 16/242* (2019.01)
*G06F 16/28* (2019.01)
*G06F 16/2457* (2019.01)
*G06F 16/25* (2019.01)

(52) U.S. Cl.
CPC ........ *G06F 16/213* (2019.01); *G06F 16/2448* (2019.01); *G06F 16/24573* (2019.01); *G06F 16/254* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 11,249,963 B2* | 2/2022 | Martinsson | G06F 16/254 |
| 2015/0019484 A1 | 1/2015 | Mack | |
| 2017/0286508 A1 | 10/2017 | Gupta | |
| 2020/0201834 A1* | 6/2020 | Ye | G06F 16/2282 |
| 2020/0225655 A1 | 7/2020 | Cella | |
| 2020/0326684 A1 | 10/2020 | Chand | |
| 2020/0348662 A1 | 11/2020 | Cella | |
| 2021/0026816 A1* | 1/2021 | Martinsson | G06F 16/288 |
| 2021/0157312 A1 | 5/2021 | Cella | |
| 2022/0129424 A1* | 4/2022 | Martinsson | G06F 16/2448 |

* cited by examiner

*Primary Examiner* — Kim T Nguyen
(74) *Attorney, Agent, or Firm* — Sterne, Kessler, Goldstein & Fox P.L.L.C.

(57) ABSTRACT

Disclosed herein are system, method, and computer program product embodiments for creating an enterprise data model that defines entities and relationships between the entities spanning multiple environments and for deploying and maintaining artifacts across the environments using metadata specified in the enterprise data model. By embedding metadata that describes foreign key references within an enterprise data model, a unifying enterprise data model may manage artifacts across multiple domains while implementing a physical, cross-domain, data architecture. Such an enterprise data model may provide an organization with a 360-degree view of the information harnessed across the organization's technical landscape and may allow the organization to easily rollout a comprehensive data warehousing solution.

20 Claims, 5 Drawing Sheets

MAINTAINING FOREIGN KEY REFERENCES ACROSS DOMAINS

CROSS REFERENCE TO RELATED APPLICATIONS

This application is a continuation of U.S. patent application Ser. No. 16/518,510, filed Jul. 22, 2019, which is incorporated herein by reference in its entirety.

BACKGROUND

Organizations may employ data models to represent information used by the organization's technical systems. Organizations may construct and express these data models using entity-relationship diagrams, XML schemas, or other suitable constructs that define the architecture while decoupling the representation from any particular physical storage implementation or solution. These data models may serve as a valuable reference for engineers within the organization and moreover, may be deployed, harnessed, and leveraged in a variety of programmatic contexts serving varied use cases.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
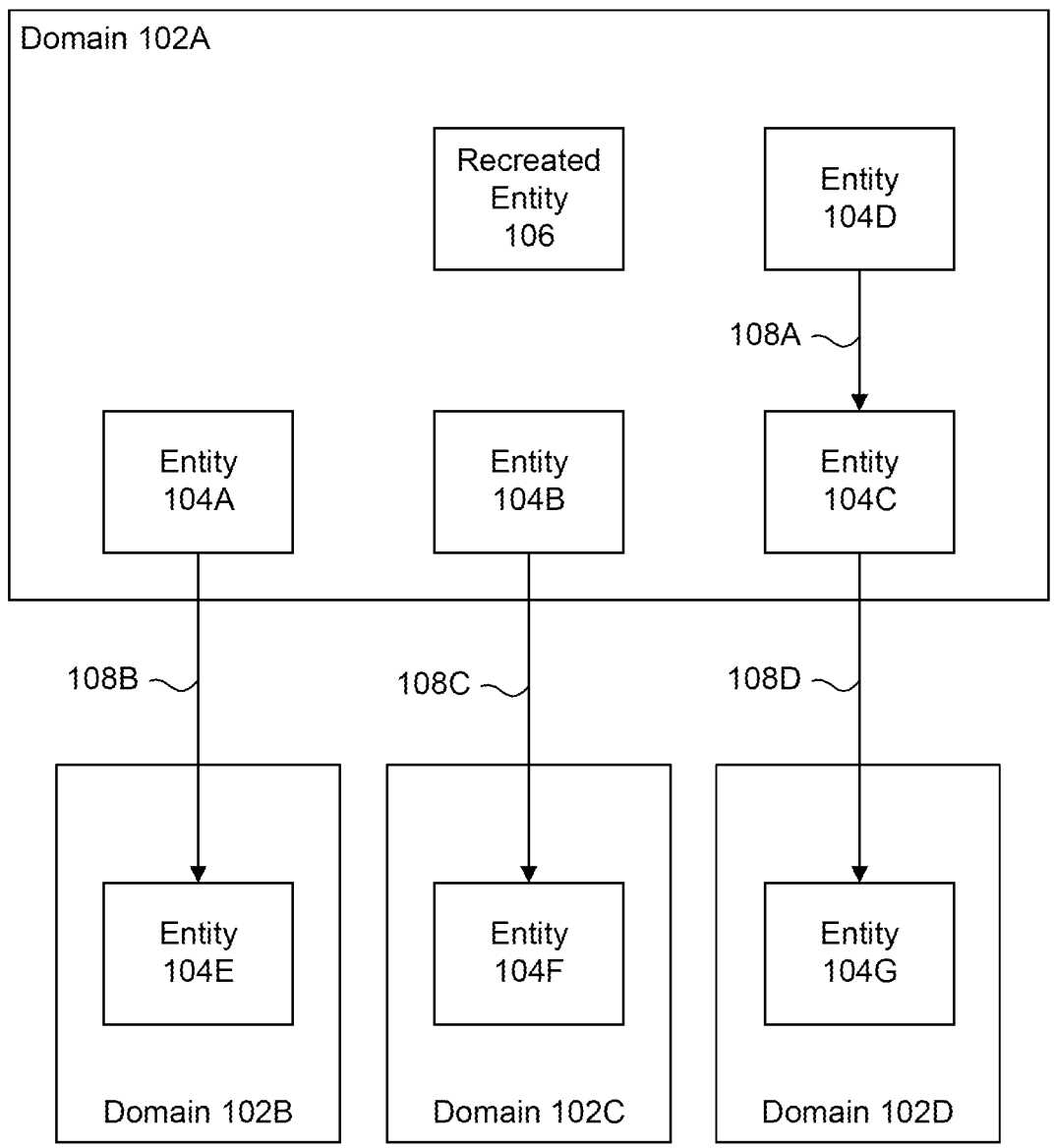
FIG. 1 is a block diagram of an environment including multiple domains, according to some embodiments.

Provided herein are system, apparatus, device, method and/or computer program product embodiments, and/or combinations and sub-combinations thereof, for creating an enterprise data model that defines entities and relationships between the entities spanning multiple domains, deploying artifacts across these multiple domains by harnessing metadata specified in the enterprise data model, and maintaining the artifacts across the multiple domains upon subsequent changes to data in the artifacts.

An enterprise data model may represent data used in an organization's technical landscape. An organization may create such an enterprise data model using a suitable data modeling technique or tool, e.g., an XML document, and one skilled in the relevant arts will appreciate that a wide-array of techniques exist generally to create data models. An enterprise data model may represent the organization's data architecture using storage- and implementation-independent means, i.e., the enterprise data model may be decoupled from particular physical storage implementations, products, approaches, or architectures and associated operational and deployment details.

The abstraction provided by an enterprise data model may offer a multitude of benefits to an organization. An enterprise data model may serve as a valuable reference for engineers within the organization. The organization may employ the enterprise data model to build a data dictionary, developer documentation, or other technical resources. Moreover, an enterprise data model may be deployed, harnessed, and leveraged in a variety of programmatic contexts and use cases, e.g., to automatically create database schema, installation scripts, and other deployment tools, to propagate changes between and among deployed components, to automatically configure data warehousing solutions, and to otherwise steward and govern data managed by the organization.

However, an organization's technical landscape may include multiple systems that reside in different domains. For example, an organization may house a customer-relationship management (CRM) system in one domain while running an order tracking system in a second domain. Domains may employ differing database technologies and/or disparate cloud-storage solutions and architectures. Servers across these domains may be located in different facilities and data centers. Thus, the multiple domains may operate under disparate security contexts and protocols and may require different credentials for access and data manipulation. Accordingly, a technical system in one domain may have curtailed, limited, or no access to data, systems, and functionality in a second domain.

As an additional complicating factor, an entity in one domain may logically reference an entity in a second domain. Such references will be referred to in this disclosure as foreign key references. For example, a database table in one domain may conceptually reference a second database table in a second domain by the second database table's primary key, e.g., the order tracking system referenced above may reference a table in the CRM system by customer identifier, customer name, etc. Because domains may differ in their security contexts and access requirements, additional logic may be required to maintain a foreign key reference to a location outside of the source domain's security context.

Organizations may employ an enterprise data model, once created, in a variety of programmatic contexts. For example, an organization may deploy physical artifacts across the multiple domains using the enterprise data model. Such artifacts may be a representation of the data model that is implemented, i.e., installed into a physical or virtual environment, through suitable deployment techniques, e.g., the creation and execution of installation scripts such as data definition language (DDL). Moreover, once deployed, such artifacts may be maintained, i.e., kept in synchronization with other artifacts referenced via foreign key references, e.g., using data manipulation language (DML) scripts.

However, problems may arise where an enterprise data model spans multiple domains and includes foreign key references traversing domains. For example, when deploying an enterprise data model, automatically created deployment/maintenance scripts may need to determine which components to deploy in which domain. For example, the CRM components in the above example may not be deployed into ordering-system domain, even though the enterprise data model may contain both the CRM components and the ordering-system components. Additionally, an enterprise data model that defines foreign key references across domains may not be able to implement the foreign key references using the tools within a particular security context or data storage solution. The foreign key references to other domains may thus need to be created, maintained, preserved, etc., using an alternate methodology.

Accordingly, a need exists to create an enterprise data model that defines entities and relationships across multiple domains using metadata and to deploy artifacts in the domains as specified in the enterprise data model.

FIG. 1 is a block diagram of environment 100 including multiple domains, according to some embodiments. Any operation herein may be performed by any type of structure in the diagram, such as a module or dedicated device, in hardware, software, or any combination thereof. Environment 100 may include domains 102, entities 104, recreated entity 106, and foreign key references 108.

Domains 102, such as domain 102A, domain 102B, domain 102C, and domain 102D may be architectures, systems, data stores, or other groupings of technical systems employed by an organization within its technical landscape. The exact configuration of domains 102 displayed in FIG. 1 is nonessential and may vary across embodiments and implementations. For example, some enterprise data models may include more domains 102, while others may include less domains 102. Some enterprise data models may describe only one domain. In an embodiment, domains 102 may be physically separated from one another, e.g., domain 102A may be housed in a separate data center, run on a different cloud solution, or stored in a different data store than domain 102B, domain 102C, and domain 102D. Domains 102 may be subject to disparate security contexts and requirements, e.g., domain 102A may be subject to different access requirements/restrictions compared to domain 102B, domain 102C, and domain 102D. Thus, domain 102A may have different access rights to data housed within domain 102A compared to data housed externally, e.g., in domain 102B, domain 102C, and domain 102D.

Entities 104, such as entity 104A, entity 104B, entity 104C, etc., may be data stores, database tables, and other data-related components, structures, and systems leveraged by and deployed within an organization's technical landscape. Entities 104 may reside, inhabit, or lie in various domains 102. In the exemplary embodiment illustrated in FIG. 1, entity 104A, entity 104B, entity 104C, and entity 104D may be databases, database tables, or other data-storage systems used by a CRM system employed by an organization and housed in domain 102A. In this example, entity 104G may be a database table related to an ordering system housed in domain 102D. Entity 104E, in domain 102B, and Entity 104F, in domain 102C, may be other systems employed by the organization. This example is merely illustrative, however, and a myriad of entities 104 may exist and may vary across organizations, fields, and industries.

Recreated entity 106 may be a recreation, i.e., a full copy, of an entity among entities 104 found in a different domain. As described below with reference to FIG. 3, recreated entity 106 facilitates one method of maintaining a foreign key reference to a different domain. Recreated entity 106 may represent the entirety of a particular entity among entities 104, for example, recreated entity 106 may be a copy of a database table in a different domain. Additionally, recreated entity 106 may be maintained via an appropriate publisher/subscription relationship with the source entity. This approach is described in further detail below with reference to FIGS. 2 and 3. In the illustrative example of FIG. 1, recreated entity 106 may be a full copy of entity 104G. Recreated entity 106 may include data that is maintained through an appropriate publisher/subscriber relationship, where changes made to the ordering-system are propagated via the established relationship via publisher/subscriber messages into recreated entity 106. Thus, following the deployment of recreated entity 106 to a particular domain among domains 102, changes made to the publisher entity may be automatically to recreated entity 106, which functions as the subscriber in the relationship.

Foreign key references 108, such as foreign key reference 108A, foreign key reference 108B, foreign key reference 108C, and foreign key reference 108D may represent a link, association, or connection between entities 104. Foreign key references 108 may correspond to a relationship between entities 104 contained within a particular domain among domains 102, e.g., foreign key reference 108A lies entirely within domain 102A. However, foreign key references 108 may also span, traverse, bisect, or cross domains. For example, foreign key reference 108B, foreign key reference 108C, and foreign key reference 108D all cross into different domains, with connections between entity 104C to entity 104G, entity 104B to entity 104F, and entity 104A to entity 104E traversing domains 102.

Foreign key references 108 may be described in an enterprise data model using metadata. In an embodiment, this description of foreign key references 108 in the enterprise data model may use one of three strategies for establishing and maintaining the foreign key reference: (1) duplication of a set of attributes associated with an entity along with an automatically created publication/subscription relationship to keep these attribute definitions and stored attribute values up-to-date; (2) a real-time lookup via an API call to an API specification that is automatically created; and (3) duplication of an entire entity, e.g., into recreated entity 106, along with an automatically created publication/subscription relationship to keep the entire entity, as well as any stored data, up-to-date. These varying approaches are described in further detail below with references to FIGS. 2 and 3.

Figure 2:
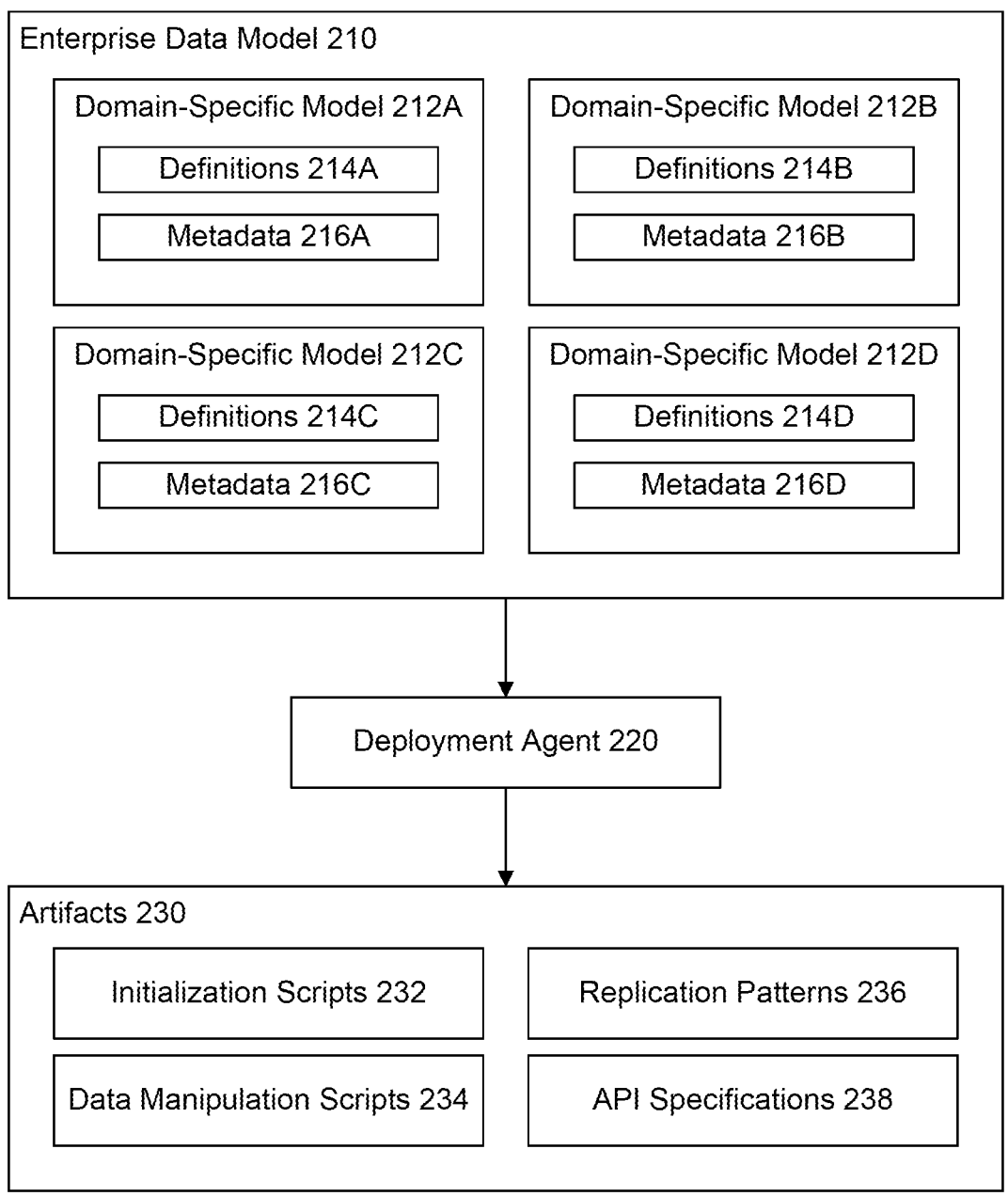
FIG. 2 is a block diagram of an architecture including an enterprise data model, according to some embodiments.

FIG. 2 is a block diagram of architecture 200 including an enterprise data model, according to some embodiments. Any operation herein may be performed by any type of structure in the diagram, such as a module or dedicated device, in hardware, software, or any combination thereof. Architecture 200 may include enterprise data model 210, deployment agent 220, and artifacts 230.

Enterprise data model 210 may be a data model depicting an organization's data landscape. Enterprise data model 210 may represent the organization's data without reference to physical devices, architectural specifics, implementation details, storage particularities, etc. Enterprise data model 210 may be represented using any suitable data modeling technique or tool, e.g., an XML document, modeling language, or suitable design tool. Enterprise data model 210 facilitates the deployment of physical artifacts across multiple domains by defining metadata that describes cross-domain references between entities, such as those referred to above as foreign key references 108. Enterprise data model 210 may include domain-specific models 212, definitions 214, and metadata 216.

Domain-specific models 212, such as domain-specific model 212A, domain-specific model 212B, domain-specific model 212C, and domain-specific model 212D may be included within enterprise data model 210. Domain-specific models 212 may provide a data model specific to and/or localized within a specific domain among domains 102. Domain-specific models 212 may be represented in a similar fashion as enterprise data model 210, e.g., using an XML document, a modeling language, or data model design tool. Domain-specific models 212 may include definitions 214 and metadata 216. For example, domain-specific model 212A may correspond to domain 102A, domain-specific model 212B, etc. Thus, domain-specific model 212A may describe and define only entities 104 contained within domain 102A, i.e., entity 104A, entity 104B, entity 104C, and entity 104D.

Definitions 214 may describe and detail entities 104 within domain-specific models 212. As described above, entities 104 may be data stores, database tables, and other data-related components, structures, and systems leveraged by and deployed within an organization's technical landscape. Definitions 214 may define entities 104 using any suitable definition techniques, for instance, unified modeling language (UML), XML, schemas, graph-database definition techniques, etc. In an embodiment, definitions 214 may define database tables and relationships between the database tables in a relational database format. In another embodiment, definitions 214 may describe graph database implementation details. In other embodiments, definitions 214 may define a wide-array of other suitable formats and/or storage techniques.

Metadata 216 may be included in enterprise data model 210 that describes relationships between entities 104 within domains 102 defined by definitions 214. Metadata 216 may define, characterize, and describe foreign key references 108. Foreign key references 108 may be to entities 104 sharing a domain with the source entities 104 as well as entities 104 located in different domains 102. Thus, metadata 216 may describe foreign key references 108 requiring different access requirements. In an embodiment, this description of foreign key references 108 in enterprise data model 210 may deploy one of three strategies to create and maintain a foreign key reference: (1) duplication of a set of attributes associated with an entity along with an automatically created publication/subscription relationship to keep these attributes up-to-date; (2) a real-time lookup via an API call to an API specification that is automatically created; and (3) duplication of an entire entity, e.g., into recreated entity 106, along with an automatically created publication/subscription relationship to keep the entire entity up-to-date. Thus, metadata 216 may specify both foreign key references 108 relevant to definitions 214, but also an approach governing how foreign key references 108 may be maintained upon subsequent changes to the data in a referenced entity.

In the first approach, metadata 216 may describe an approach that maintains a cross-domain foreign key association by duplicating attributes in one entity, i.e., source attributes, in one domain into second attributes, i.e., destination attributes, in a second domain. Attributes in this sense may be columns of a database table, nodes in a graph database, or any other suitable subset or grouping of the data in the source attribute. To further this approach, metadata 216 may include descriptions of the foreign key associations, e.g., what attributes the foreign key reference describes and in which domain the attributes reside. Deployment agent 220 may then read metadata 216 and create code that automatically establishes publisher/subscriber relationships between the attributes. For example, definitions 214 may describe a Sales Order table in an ordering system. Thus, definitions 214 may be a schema or other suitable description of the Sales Order table. This Sales Order table may include foreign key references 108 to a CRM system that includes an Account table. The Account table may include fields such as Account ID, Customer ID, Account Number, etc. In this example, metadata 216 may specify that Account ID and Customer ID are current attributes to be maintained in both the source domain and the destination domain. Thus, deployment agent 220 may create these fields, Account ID and Customer ID, in the destination domain. Deployment agent 220 may also automatically create code that establishes and maintains a publisher/subscriber relationship between the Account Table and the Sales Order table. Thus, any changes made to the Account Table may be propagated into the Sales Order table via the publisher/subscriber relationship. Such changes may include an actual definition of the columns in the Account Table as well as any data that is changed in those columns.

For the second approach, metadata 216 may describe an approach that maintains a cross-domain foreign key association through an API call to an appropriate API specification. Here, the destination attributes are maintained by calling an appropriate function to update the data in the destination domain when data changes in the source domain. Moreover, deployment agent 220 may use metadata 216 to automatically create an API specification that defines appropriate API functions, establishes logins and security credentials, and otherwise maintains the association. For example, the above-described Sales Order table may also include information about a Product being purchased. The Product table(s) may be stored in a separate domain that is not immediately accessible the security context for the first domain. In this example, metadata 216 may describe an API specification for creation, e.g., account information, access credentials, and appropriate functions to access the Product table when needed by the source entity. In this example, when a technical system accessing data in the destination entity needs to access the source domain's data, an appropriate API call may be instantiated to query relevant data and the data transmitted across the domains for various usages in the destination domain.

For the third approach, metadata 216 may describe an approach that maintains a cross-domain foreign key association by duplicating an entire entity, i.e., a source entity, in one domain into a second domain. This approach differs from the first approach in that the entire entity is recreated as recreated entity 106 in the destination domain and then maintained via a publisher/subscriber relationship, as opposed to just a set of attributes associated the entity. To further this approach, metadata 216 may include descriptions of the foreign key associations, e.g., what entity is to be copied. Deployment agent 220 may then read metadata 216 and build code that automatically establishes publisher/subscriber relationships between entities 104. For example, definitions 214 may describe a Sales Order table in an ordering system that includes a reference to a Locale table. The Locale table may be housed in a different domain. In this example, metadata 216 may specify that the entirety of the Locale table, which is housed in a different domain, is to be created in the destination system and then updated when a change is made to the source system. Deployment agent 220 may thus automatically create recreated entity in the destination domain. Deployment agent 220 may also automatically create code that establishes a publisher/subscriber relationship between the Locale table and the Sales Order table. Thus, any changes made to the Locale Table, either to its definition or contained data, may be propagated into the Sales Order table via the publisher/subscriber relationship.

One skilled in the relevant art(s) will appreciate that the three above approaches may be combined, assembled, used, etc. within enterprise data model 210 according to the specific requirements of the organization's data landscape.

For instance, data that is more static may lend itself to the third approach. For another example, some security architectures may not support publisher/subscriber relationships and in such an environment, an API call may be the most appropriate recourse for gathering updated data. Furthermore, other approaches, in addition to those described above, may be available within the limits of this disclosure to further govern the maintenance of foreign key references 108 with respect to changes to actual data in the referenced entity.

Deployment agent 220 may programmatically deploy, initialize, and maintain artifacts across an organization's technical landscape with reference to enterprise data model 210. For instance, deployment agent 220 may process enterprise data model 210 and generate installation and maintenance scripts for creating and updating database tables. Deployment agent 220 may also update previously deployed artifacts in a domain based on a change made to an enterprise data model. Deployment agent 220 may generate code and other artifacts that create and maintain foreign key references 108 between entities 104 lying in different domains 102, for instance publisher/subscriber relationships and API calls. As changes are made to enterprise data model 210 over time, deployment agent 220 may update and/or redeploy artifacts based on the changes.

Deployment agent 220 may also deploy an enterprise data model 210 into a data warehousing solution, as described with reference to FIG. 4. Such a data warehousing solution may store a comprehensive copy of an organization's data landscape, consolidating the data used across multiple technical systems across different domains used by a particular organization into a single, consolidated location. The data warehousing solution may subsequently be populated, updated, or refreshed with data from across the data landscape using enterprise data model 210. Such a data warehousing solution may provide a valuable analytical tool to the organization.

Artifacts 230 may include tools to instantiate enterprise data model 210 in a physical environment, domain, or architecture and to maintain the deployed enterprise data model 210. Artifacts 230 may be data model scripts, database initialization scripts (e.g., DDL or DML scripts), publisher/subscriber relationships, API specifications, and other suitable tools and programmatic constructs that create and maintain entities and the relationships between those entities. For example, to continue the CRM-example referenced above, artifacts 230 may include multiple components to create the database tables used by the CRM system and maintain the foreign key references to other tables. In this illustrative example, artifacts 230 may include a data modeling script to create the database tables in a particular domain as well as scripts to create publisher/subscriber relationships to/from entities in the customer ordering system. Artifacts 230 may include initialization scripts 232, data manipulation scripts 234, replication patterns 236, and API specifications 238.

Initialization scripts 232 may be database initialization scripts provided in a data definition language (DDL) or other suitable syntax capable of defining data structures. Initialization scripts 232 may be used to deploy, initialize, rollout, or otherwise implement physical elements related to enterprise data model 210. For example, initialization scripts 232 may be built automatically by deployment agent 220 to implement the Sales Order, Account, and Locale tables described above through the creation of DDL syntax, e.g., "CREATE TABLE," "ALTER TABLE", etc.

Data manipulation scripts 234 in a data manipulation language (DML) or other suitable syntax capable of accessing, modifying, and retrieving data from deployed structures. Data manipulation scripts 234 may be used to update, maintain, and synchronize systems deployed based on enterprise data model 210. For example, data manipulation scripts 234 may be built automatically by deployment agent 220 to make changes to the previously deployed Sales Order, Account, and Locale tables described above through the creation and execution of DML syntax, e.g., "UPDATE," "INSERT INTO TABLE", etc.

Replication patterns 236 may provide a scalable event ingestion and delivery system or other publish-subscribe pattern. Replication patterns 236 may provide a manner of maintaining entities 104 and/or recreated entity 106 when a publisher/subscriber relationship is established to maintain foreign key references 108. A publisher may send messages to the subscriber when replication patterns 236 are established that indicate changes have been made to the publisher. Through replication patterns 236, a change made to a source entity may be propagated to a destination entity while adhering to domain-specific security protocols and access requirements.

API specifications 238 may be application programming interface definitions that provide a set of functional definitions and communication protocols. API specifications 238 may be automatically generated and may provide a method via which an entity among entities 104 may access data provided by an entity in a different domain.

Figure 3:
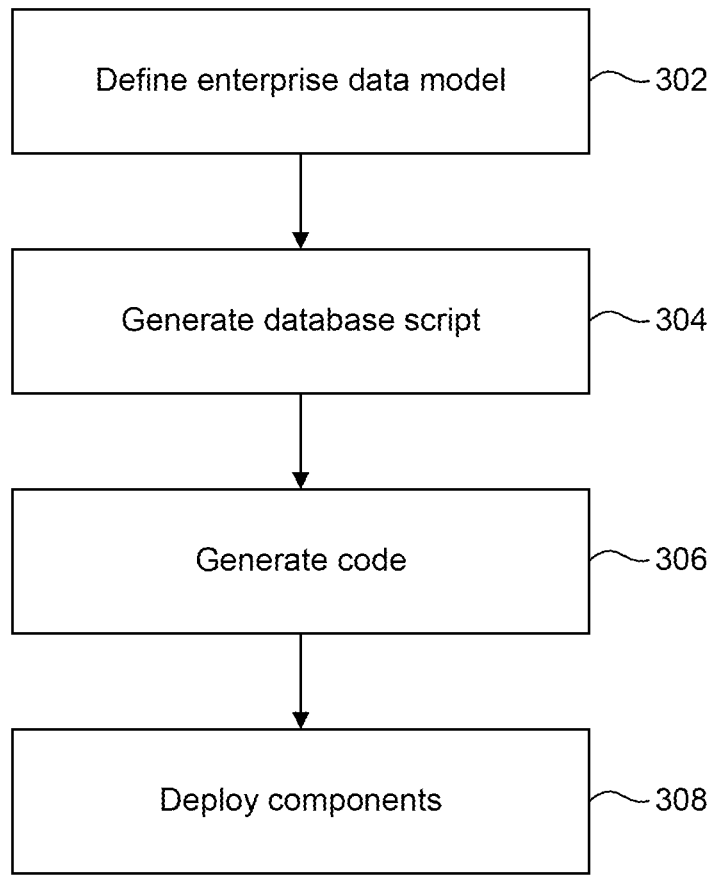
FIG. 3 is a flowchart illustrating a method of deploying components based on an enterprise data model, according to some embodiments.

FIG. 3 is a flowchart illustrating method 300 of deploying components into a physical architecture based on enterprise data model 210 including metadata 216. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, enterprise data model 210 may be defined by an organization to reflect the organization's technical landscape, i.e., data used by technical systems across one or more domains. Enterprise data model 210 may be specified in an XML document, created in a data modeler or data architecting tool, or implemented using any other suitable approach. Enterprise data model 210 may be created to include specific domain-specific models such as domain-specific models 212. Domain-specific models 212 may include definitions 214 that describe entities 104 within domains 102. Domain-specific models 212 may also include metadata 216 that describes foreign key references 108 between entities 104. Foreign key references 108 may transcend, span, cross, bisect, etc., domains within domains 102. By including metadata describing foreign key references 108, the subsequent steps in method 300 may be performed by deployment agent 220 to deploy components into a physical architecture.

In 304, deployment agent 220 may generate deployment scripts to create entities 104. Deployment agent 220 may spawn scripts in DDL, DML, etc., such as those described above as installation scripts 232 and data manipulation scripts 234. Deployment agent 220 may automatically create the scripts based on the definitions 214 and metadata 216 provided within enterprise data model 210. For example, deployment agent 220 may automatically generate a "CRE- ATE TABLE" statement or statements to instantiate tables or other data structures needed by a Sales Order system, e.g., an Order table, a Status table, a Product table, etc. One skilled in the arts will appreciate that foreign key references 108 may exist in intra-domain format, i.e., reference entities within a single domain. For such foreign key references 108, deployment agent 220 may be able to create and maintain the intra-domain foreign key reference via installation scripts 232, e.g., by adding appropriate options, flags, details, etc. into installation scripts 232 and data manipulation scripts 234. For example, deployment agent 220 could add an appropriate parameter to a "CREATE TABLE" statement in the installation scripts to create the intra-domain foreign key references.

In 306, deployment agent 220 may generate appropriate artifacts 230. As described above, artifacts 230 may maintain foreign key references 108 that cross between domains 102. Deployment agent 220 may create replication patterns 236, API specifications 238, and other suitable programmatic constructs with reference to enterprise data model 210 to establish foreign key references 108. For example, deployment agent 220 may examine metadata 216 and determine that one of the above-described approaches to maintaining a cross-domain foreign key references is evidenced. Deployment agent 220 may then create code to generate appropriate publisher/subscriber relationships across the domains, if metadata 216 evidences the first or third approach. Deployment agent 220 may generate an appropriate API specification if metadata 216 evidences the second approach.

In 308, deployment agent 220 may deploy various physical components based on artifacts 230 generated in 306. Deployment agent 220 may engage appropriate functions to implement, spawn, or bring into existence physical components, e.g., create database tables, configure publisher/subscriber relationships, and perform other functions based on enterprise data model 210. In an embodiment, deployment agent 220 may deploy components iteratively across the various domains, for instance, starting in domain 102A, then domain 102B, etc. Deployment agent 220 may also deploy the components into just one domain, such as domain 102A.

Figure 4:
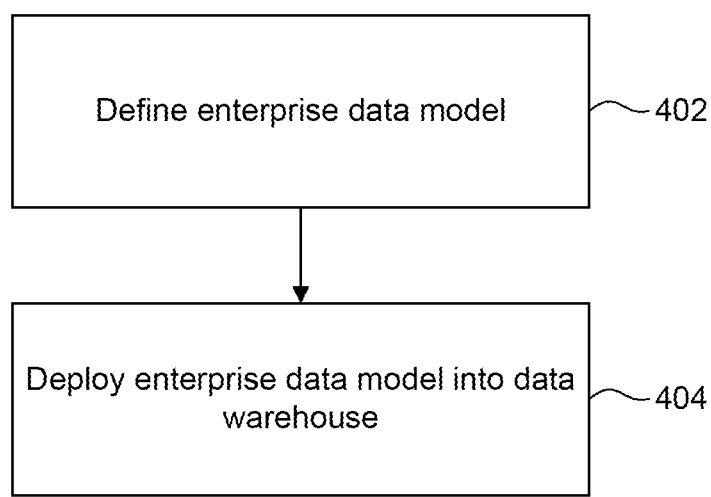
FIG. 4 is a flowchart illustrating a method of deploying an enterprise data model into a data warehouse, according to some embodiments.

FIG. 4 is a flowchart illustrating method 400 of deploying a received enterprise data model into a data warehouse, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, an organization may define enterprise data model 210 to describe the technical landscape of the organization. An organization may create such enterprise data model 210 using any suitable data modeling technique or tool, e.g., an XML document, a data modeler, data architecting tool, etc. Enterprise data model 210 may be created to include specific domain-specific models such as domain-specific models 212.

In 404, deployment agent 220 may deploy enterprise data model 210 into a data warehouse solution. Many suitable data warehousing solutions exist that may facilitate this disclosure, as one skilled in the relevant art(s) will understand. Deployment agent 220 may deploy various physical components into the data warehousing solution, such as tables, dimensions, or other data structures and related context. Deployment agent 220 may also perform any appropriate extract, transform, load (ETL) functions to format the data into the data warehouse. Moreover, deployment agent 220 may import data from systems defined in enterprise data model 210 into the data warehousing solution. Accordingly, an organization may create a data warehousing solution and populate the data warehousing solution with data from across the organization's technical landscape. Such a data warehouse may provide a valuable technical resource and provide significant analytical capabilities.

Figure 5:
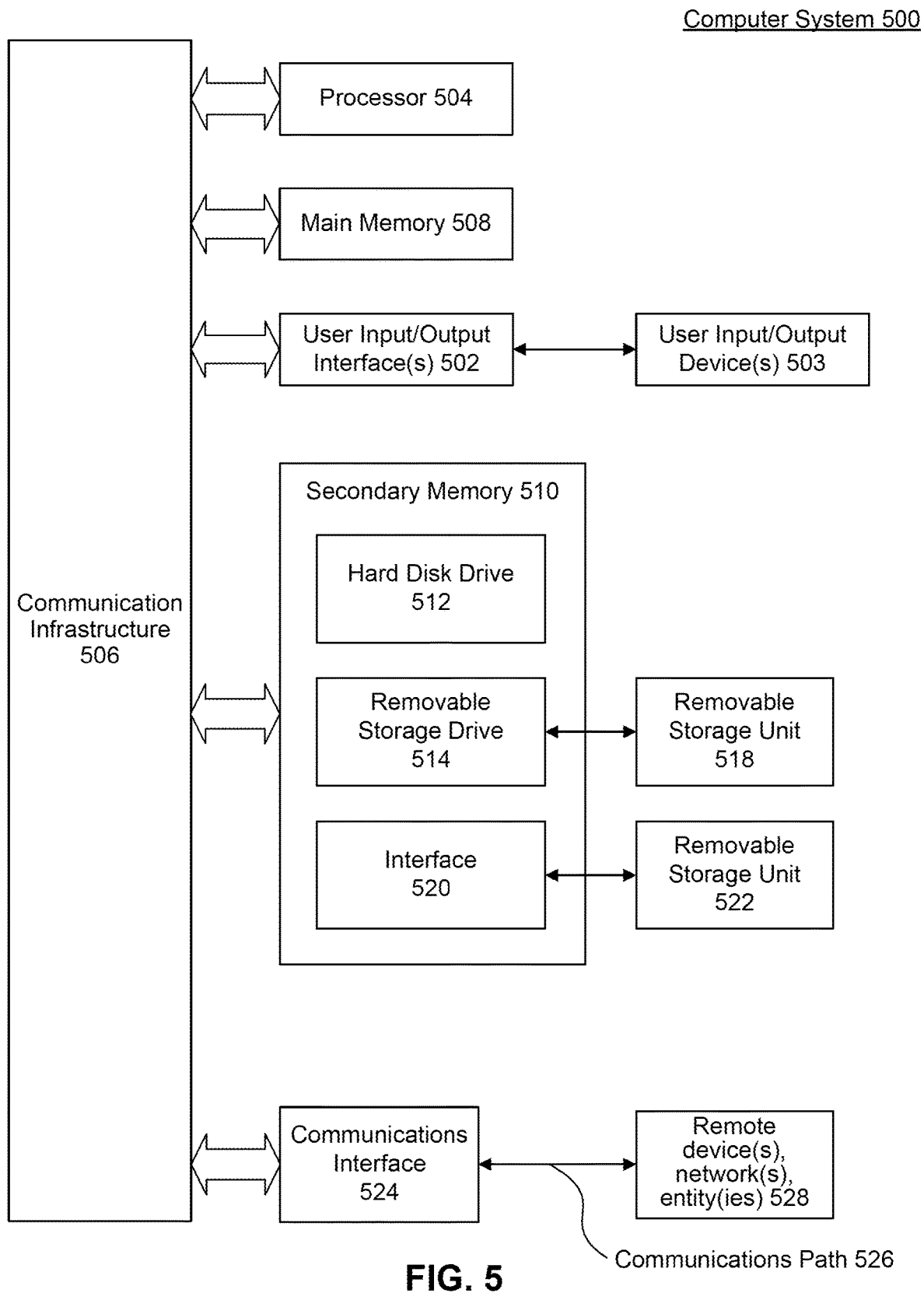
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    defining, by one or more processors, an enterprise data model comprising a first entity, a second entity, and metadata, wherein the metadata describes a foreign key reference between the first entity and the second entity and an approach for maintaining the foreign key reference, wherein the first entity is located in a first domain and the second entity is located in a second domain, and wherein the metadata specifies that attributes in the second entity are to be queried in real-time using an application programming interface ("API");
    deploying, by the one or more processors, components of the enterprise data model in the first domain;

generating, by the one or more processors, an artifact based on the metadata that maintains the foreign key reference between the first entity and the second entity, wherein the artifact comprises an API specification providing for data-lookup from the first entity to the second entity via an API call; and in response to a data change in the second entity, executing the API call to query data in the second entity, receive a result from the API call, and update the first entity based on the result.

2. The method of claim 1, wherein the API specification defines a login and security credentials for accessing executing the API call.

3. The method of claim 1, further comprising:

receiving, by the one or more processors, a change to the enterprise data model; and updating, by the one or more processors, the components based on the change.

4. The method of claim 1, wherein the first entity is a table in a database.

5. The method of claim 1, wherein the enterprise data model describes a customer relationship management system.

6. The method of claim 1, further comprising:

providing, by the one or more processors, an online tool that presents a model of the first entity and the second entity, builds the enterprise data model, and generates the metadata.

7. The method of claim 1, further comprising:

deploying physical components in the enterprise data model into a data warehousing solution; and populating the data warehousing solution with data imported from the first entity and second entity.

8. A system comprising:

a memory; and at least one processor coupled to the memory and configured to:

define an enterprise data model comprising a first entity, a second entity, and metadata, wherein the metadata describes a foreign key reference between the first entity and the second entity and an approach for maintaining the foreign key reference, wherein the first entity is located in a first domain and the second entity is located in a second domain, and wherein the metadata specifies that attributes in the second entity are to be queried in real-time using an application programming interface ("API");

deploy components of the enterprise data model in the first domain;

generate an artifact based on the metadata that maintains the foreign key reference between the first entity and the second entity, wherein the artifact comprises an API specification providing for data-lookup from the first entity to the second entity via an API call; and in response to a data change in the second entity, executing the API call to query data in the second entity, receive a result from the API call, and update the first entity based on the result.

9. The system of claim 8, wherein the API specification defines a login and security credentials for executing the API call.

10. The system of claim 8, the at least one processor further configured to:

receive a change to the enterprise data model; and update the components based on the change.

11. The system of claim 8, wherein the first entity is a table in a database.

12. The system of claim 8, wherein the enterprise data model describes a customer relationship management system.

13. The system of claim 8, the at least one processor further configured to:

provide an online tool that presents a model of the first entity and the second entity, builds the enterprise data model, and generates the metadata.

14. The system of claim 8, the at least one processor further configured to:

deploy physical components in the enterprise data model into a data warehousing solution; and populate the data warehousing solution with data imported from the first entity and second entity.

15. A non-transitory computer-readable device having instructions stored thereon that, when executed by at least one computing device, cause the at least one computing device to perform operations comprising:

defining an enterprise data model comprising a first entity, a second entity, and metadata, wherein the metadata describes a foreign key reference between the first entity and the second entity and an approach for maintaining the foreign key reference, wherein the first entity is located in a first domain and the second entity is located in a second domain, and wherein the metadata specifies that attributes in the second entity are to be queried in real-time using an application programming interface ("API");

deploying components of the enterprise data model in the first domain;

generating an artifact based on the metadata that maintains the foreign key reference between the first entity and the second entity, wherein the artifact comprises an API specification providing for data-lookup from the first entity to the second entity via an API call; and in response to a data change in the second entity, executing the API call to query data in the second entity, receive a result from the API call, and update the first entity based on the result.

16. The non-transitory computer-readable device of claim 15, wherein the API specification defines a login and security credentials for executing the API call.

17. The non-transitory computer-readable device of claim 15, the operations further comprising:

receiving a change to the enterprise data model; and updating the components based on the change.

18. The non-transitory computer-readable device of claim 15, wherein the first entity is a table in a database.

19. The non-transitory computer-readable device of claim 15, wherein the enterprise data model describes a customer relationship management system.

20. The non-transitory computer-readable device of claim 15, the operations further comprising:

deploying physical components in the enterprise data model into a data warehousing solution; and populating the data warehousing solution with data imported from the first entity and second entity.

* * * * *

UNITED STATES PATENT AND TRADEMARK OFFICE
CERTIFICATE OF CORRECTION

| | |
|---|---|
| PATENT NO. | : 11,687,503 B2 |
| APPLICATION NO. | : 17/570798 |
| DATED | : June 27, 2023 |
| INVENTOR(S) | : Martinsson |

It is certified that error appears in the above-identified patent and that said Letters Patent is hereby corrected as shown below:

On the Title Page

Column 2, Item (74), in "Attorney, Agent, or Firm", Line 2, delete "P.LL.C." and insert -- P.L.L.C. --, therefor.

In the Claims

In Column 13, Claim 2, Line 12, after "for" delete "accessing".

Signed and Sealed this
First Day of August, 2023

*Katherine Kelly Vidal*
*Director of the United States Patent and Trademark Office*